Figure 1:
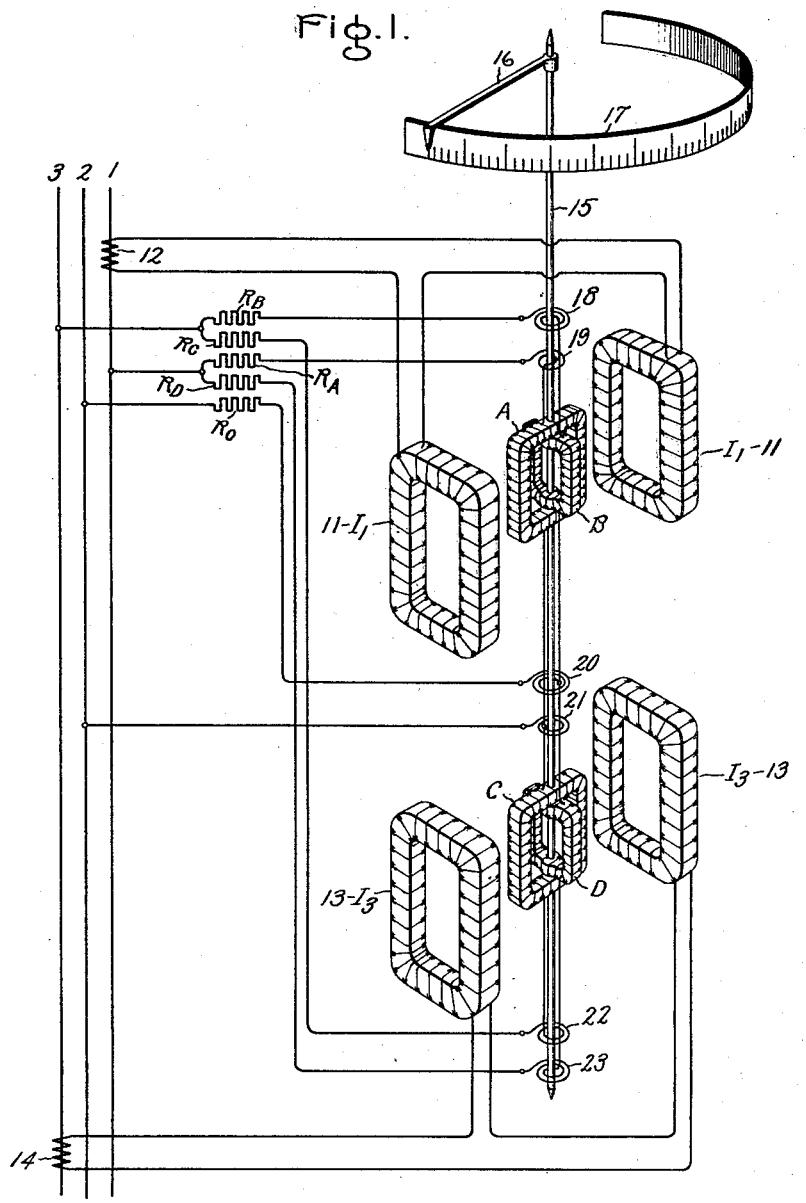

Oct. 3, 1933.  R. M. ROWELL  1,929,289
ELECTRICAL INSTRUMENT
Filed May 18, 1932   2 Sheets-Sheet 1

Inventor:
Ralph M. Rowell,
by Charles E. Mullen
His Attorney.

Oct. 3, 1933.    R. M. ROWELL    1,929,289
ELECTRICAL INSTRUMENT
Filed May 18, 1932    2 Sheets-Sheet 2
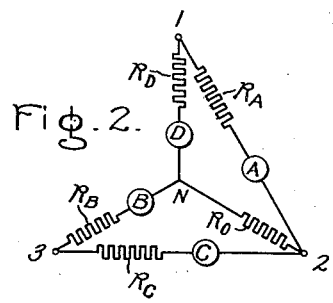
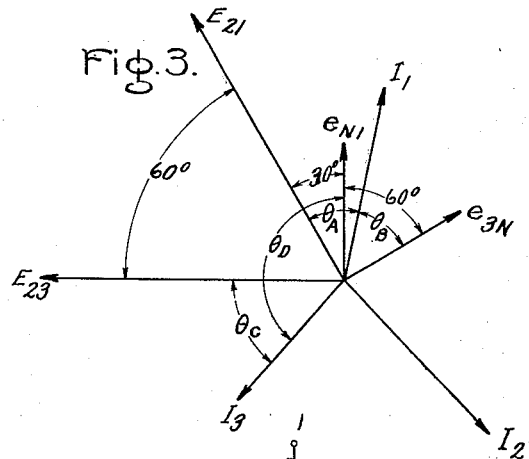
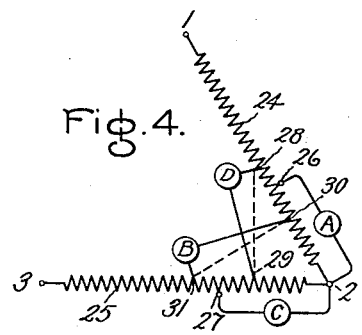
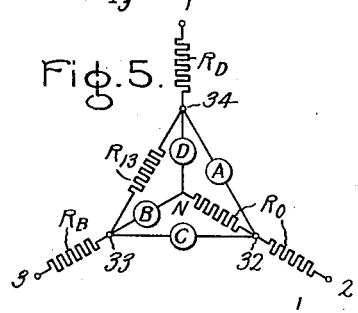
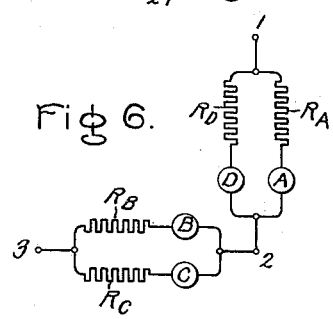
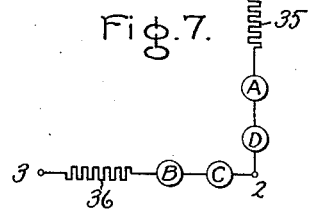
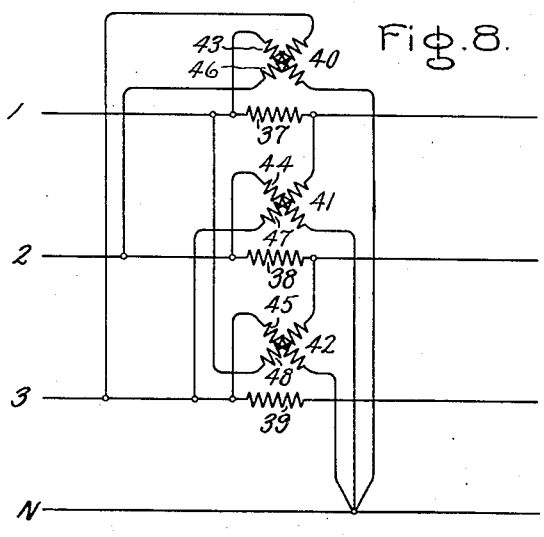
Inventor:
Ralph M. Rowell,
by Charles E. Mullen
His Attorney.

Patented Oct. 3, 1933

1,929,289

UNITED STATES PATENT OFFICE 1,929,289

ELECTRICAL INSTRUMENT

Ralph M. Rowell, Lynn, Mass., assignor to General Electric Company, a corporation of New York Application May 18, 1932. Serial No. 612,035

10 Claims. (Cl. 172—245)

My invention relates to electrical instruments and concerns particularly power factor responsive devices for use in polyphase circuits.

In the case of a polyphase circuit having balanced loads, the power factor may readily be obtained in a manner corresponding to that used for single-phase circuits either by computation from readings of current, voltage and power or from a power factor indicating instrument connected in one of the phases of the circuit.

In the case of unbalanced load, an average value of power factor might be obtained from readings for each phase, if the phase connections are available. An expression for power factor might also be obtained by computation using the average values of power, voltage, and current. In the case of unbalanced loads none of the values for power factor thus obtained, however, corresponds strictly with the true polyphase power factor which is defined as the ratio of the total power of all the phases to the vector sum of the apparent powers of the phases. In an effort to produce an instrument which will be unaffected by load unbalance in a polyphase circuit, instruments have been suggested employing various elaborate auxiliary devices.

It is an object of my invention to provide a simple arrangement of elements of types heretofore commonly used in electrical instruments in order to provide an instrument for indicating or recording polyphase power factor or to provide a contact-making instrument responsive to polyphase power factor. It is a further object of my invention to provide a polyphase power factor instrument wherein the accuracy is substantially unaffected by load unbalance. Other and further objects will become apparent as the description proceeds.

In accordance with my invention in its preferred form, I provide an instrument having a plurality of electrodynamometer type instrument units. Each unit has stationary and movable elements and all of the movable elements are mechanically connected to form a single movable member. The stationary element of each unit comprises one or more current coils connected directly or through current transformers in one of the conductors of the polyphase circuit. The movable elements comprise crossed coils one of which may be called a power component potential coil and the other of which may be called a quadrature potential coil. The power component potential coils are connected between suitable conductors of the polyphase circuit directly or through suitable transformers or resistances in a manner similar to that in which the potential coils of wattmeters are customarily connected.

The quadrature potential coils are connected in a suitable manner either through transformer or resistance networks or in some cases directly or through other suitable lagging means, so as to be influenced by voltages in quadrature with the voltages influencing the corresponding power component potential coils or so as to carry currents lagging 90 degrees behind those in the corresponding power component potential coils. The connections are such that the torque produced by the reaction between the currents in the power component potential coils and the current coils opposes the torque produced by the reaction between the currents in the quadrature potential coils and the current coils. The movable element assumes a position at which the torques are balanced and the position assumed provides an indication of the power factor.

The features of my invention which I believe to be novel and patentable will be pointed out in the claims appended hereto. My invention itself, however, may be best understood by referring to the following description taken in connection with the accompanying drawings in which Fig. 1 represents schematically an arrangement of elements forming an apparatus which constitutes one embodiment of my invention; Fig. 2 is a diagram representing connections which may be employed for the potential coils of the apparatus; Fig. 3 is a vector diagram explaining the relationship between various voltages and currents acting in the apparatus when connected to a polyphase circuit in which the loads are unbalanced; Fig. 4 represents an arrangement in which the potential coils are energized from autotransformers; Fig. 5 is a diagram representing a modified method of connecting the potential coils of the apparatus; Figs. 6 and 7 represent modifications which may be employed in two-phase circuits; and Fig. 8 represents a connection which may be utilized in connection with circuits having a neutral conductor.

Referring now more in detail to the drawings in which like reference characters refer to like parts throughout I have illustrated an arrangement for measuring power factor in a polyphase circuit shown by way of illustration as a three-phase circuit having the conductors 1, 2, and 3.

A split current coil 11 is connected to the secondary winding of a current transformer 12 having its primary winding connected in series with the conductor 1 so that the coil 11 carries a current representing the line current $I_1$ of the conductor 1. A similar split current coil 13 is connected to the secondary winding of the current transformer 14 having its primary winding connected in series with the conductor 3 of the polyphase circuit. Accordingly, current coil 13 carries current which represents the line current $I_3$ flowing in the line conductor 3. For the sake of clearness in the illustration a greater separation is shown between current coils and the potential coils than that which would actually be employed.

A pair of crossed potential coils A and B cooperate with the current coil 11 to form one instrument unit of the electrodynamometer type and a similar pair of crossed potential coils C and D cooperate with the current coil 13 to form another instrument unit of the electrodynamometer type. The elements of each unit are relatively movable, and the movable elements of the two units are mechanically connected. Although any desired mechanical arrangement may be employed, preferably the current coils 11 and 13 are stationary and the potential coils A, B, C, and D are movable, A and B rotating about the line formed by the intersection of their planes and C and D likewise rotating about the intersection of their planes. Preferably the potential coils A, B, C, and D are mounted on a common shaft 15 supported by bearings, not shown, to form a single movable member. The movable member may carry a pointer 16 cooperating with a scale 17 to form an indicating instrument; but it will be understood that I am not limited to this exact arrangement as my invention obviously includes recording and contact-making instruments.

Suitable means such as hair springs 18 to 23 are provided in order to form flexible connections between the potential coils carried by the moving member and the stationary parts of the instrument. Hair springs 18 and 19 are connected to leads from potential coils B and A respectively, hair spring 20 is connected to leads from potential coils B and D; hair spring 21 to leads from A and C; and hair springs 22 and 23 to leads from potential coils C and D respectively.

The potential coils A and C which will be referred to as power component potential coils, are so connected that they will respond to the voltages between line conductors 1 and 2 and between line conductors 3 and 2, respectively. Any suitable means for limiting the current in the potential coils to a suitable value may be employed. For example, potential coil A has one terminal connected to line 2 through hair spring 21 and the other terminal connected through hair spring 19 in series with a resistance $R_A$ to line 1. In a similar manner potential coil C is connected through hair springs 21 and 22 in series with resistance $R_C$ between lines 2 and 3.

It will be observed that the arrangement of potential coil A and current conducting coil 11 is such that the torque between coils A and 11 is proportional to the power of line current $I_1$ taken with line voltage $E_{21}$. In a similar manner the torque between coils C and 13 is proportional to the power of current $I_3$ taken with line voltage $E_{23}$. The algebraic sum of the two torques is proportional to the total power of the three-phase circuit, since this corresponds to the well known two-wattmeter connection for measuring power in a three-conductor polyphase circuit which is really a special case of the $(n-1)$ wattmeter method of measuring power in a polyphase circuit having $n$ conductors.

Quadrature coils B and D are attached substantially at right angles to the corresponding power component potential coils A and C and they are connected so as to be responsive to voltages substantially in quadrature with the voltages affecting the power component potential coils or so as to carry currents lagging substantially 90 degrees behind the currents in the power component potential coils. The quadrature voltages may be obtained in any desired manner but in the case of three-phase circuits I find that the quadrature voltages may satisfactorily be obtained by utilizing the connection shown in Figs. 1 and 2, the phase relationships of which are more clearly brought out by the diagrams forming Figs. 2 and 3. A star or Y-connected network of resistances is formed in which a resistance $R_O$ forms one leg extending from an artificial neutral N to the line conductor 2, a resistance $R_D$ and quadrature potential coil D in series form another leg from the point N to the line conductor 1, and a resistance $R_B$ and quadrature potential coil B in series form a third leg from the point N to the line conductor 3. It will be seen that the voltage from neutral to line 1, designated by $e_{N1}$, is 90 degrees out of phase with voltage $E_{23}$ between lines 2 and 3 and likewise voltage $e_{3N}$, from line 3 to neutral N is 90 degrees out of phase with voltage $E_{21}$ between lines 2 and 1.

In the vector diagram, Fig. 3, the vectors $I_1$, $I_2$ and $I_3$ represent unbalanced load currents in line conductors 1, 2, and 3; $E_{21}$ and $E_{23}$ represent the line voltages from conductor 2 to conductors 1 and 3 respectively, which voltages influence potential coils A and C respectively; and $e_{N1}$ and $e_{3N}$ represent voltages in the Y-connected resistance network between the artificial neutral N and the line conductors 1 and 3 respectively, which voltages influence potential coils B and D respectively. $I_1$ makes angles of $\theta_A$ and $\theta_B$ with voltages $E_{21}$ and $e_{3N}$ with which it acts, and $I_3$ makes angles $\theta_C$ and $\theta_D$ with voltages $E_{23}$ and $e_{N1}$ with which it acts. From Figs. 2 and 3 it is apparent that voltages in quadrature influence potential coils A and B which cooperate with current coil 11, and that likewise voltages in quadrature influence potential coils C and D which cooperate with current coil 13.

It will be seen that quadrature potential coils B and D with the corresponding current coils 11 and 13 respectively form reactive power meters since the currents acting are the same currents acting in the case of a watt-meter and the voltages acting are voltages just 90 degrees out of phase with the voltages which would act in a wattmeter. Just as in the case of wattmeters, two reactive power meters may be arranged to measure the total reactive power in a three-phase circuit by employing the connections indicated in the diagram.

The connections are such that the torques acting on coils B and D act oppositely to the torques acting on coils A and C. Furthermore, for any given values of currents and voltages the torque acting on one set of potential coils decreases with deflection in a given direction while the torque acting on the other set of potential coils increases with deflection in the same direction, owing to the mechanical angular relationship between the coils. Consequently, the movable element will deflect until the torques are balanced and the angular position at the point of balance provides an indication of the relationship between the reactive power and the real power in the manner of ratio instruments well known in the art.

Since the apparatus is responsive to the total reactive power and the total true power, it is obviously unaffected by unbalanced load in the polyphase circuit.

Although I have illustrated in Figs. 1 and 2 an arrangement for obtaining the necessary quadrature voltages in a three-phase circuit, it will be understood that I am not limited to this exact arrangement. If desired a suitable arrangement of transformers or autotransformers may be employed instead of a resistance network for obtaining the lagged or quadrature voltages. For example, in Fig. 4 I have shown an arrangement of autotransformers which may be utilized to reduce the voltages to suitable values for connection to the potential coils as well as to provide quadrature voltages. A transformer 24 is connected between lines 1 and 2 and a transformer 25 is connected between lines 3 and 2. The power component potential coil A is connected to transformer 24 at tap 26 and terminal 2, and the other power component potential coil C is connected to transformer 25 at tap 27 and terminal 2. The quadrature potential coils B and D are connected from suitable taps on one transformer to suitable taps on the other. If it is desired to subject each potential coil to the same effective value of voltage, taps 26 and 27 will be chosen to give equal voltages with respect to terminal 2. Quadrature potential coil D may be connected between tap 28 of transformer 24 giving 115.4% of the voltage of tap 26 and tap 29 of transformer 25 giving 57.7% of the voltage of tap 27. In a similar manner quadrature potential coil B may be connected between 57.7% tap of transformer 24 and 115.4% tap of transformer 25. However, it will be understood that I am not limited to this exact arrangement of transformers. Obviously resistances arranged in a similar manner to autotransformers 24 and 25 might be employed instead of autotransformers.

If desired, the resistance network shown in Fig. 2 may be modified in order to permit using a smaller number of flexible conductors or hair springs for carrying the current from the coils of the moving element to the stationary parts of the instrument. As illustrated in Fig. 5, the potential coils B and D are combined with the resistances $R_B$, $R_D$, and $R_O$ to form a star or Y-connected resistance network as shown in Fig. 2. The potential coils A and C and a resistance $R_{13}$, however, are connected in mesh or delta between intermediate points of the Y-connected network. Potential coil C is connected between tap 32 in resistance $R_O$ and point 33, common to resistance $R_B$ and potential coil B. Similarly, potential coil A is connected between tap 32 and point 34, common to resistance $R_D$ and potential coil D. Resistance $R_{13}$ is connected between points 33 and 34 to balance the network. Preferably the resistances of potential coils B and D are substantially equal to each other and to the resistance of the portion of the resistor $R_O$ lying between tap 32 and point N; and likewise the resistances of potential coils A and C are substantially equal to each other and to the resistance of resistor $R_{13}$, in order to balance the voltages in the network.

In Fig. 1, if it is desired to mount the resistors $R_A$, $R_B$, $R_C$, $R_D$, and $R_O$ externally, six hair springs or flexible conductors 18 to 23 are required to make the connections between the current conducting coils A, B, C, and D and the external portion of the apparatus. In the arrangement of Fig. 5, however, each of the potential coils A, B, C, and D is directly connected to two other potential coils. Consequently, only 4 leads, each one common to two of the potential coils need be brought out through flexible conductors, the common points being N, 32, 33, and 34.

In case the arrangement is used for measurement of power factors in circuits having a different number of phases than three, it will be understood that suitable modifications are to be made in the arrangement of resistances or transformers and that in some cases the quadrature coils, as well as the power component potential coils, may be directly connected. For example, if the conductors represented in Figs. 1 and 2 are connected to a two-phase circuit instead of a three-phase circuit with one phase between the conductors 1 and 2 and the second phase between conductors 2 and 3 as represented diagrammatically in Fig. 6, voltage $E_{21}$ would be in quadrature with voltage $E_{32}$ and $R_O$ might be made equal to zero. This would be equivalent to connecting power component potential coil C directly in one phase and quadrature potential coil D directly in the other phase, a similar arrangement being used for potential coils A and B. The arrangement of Fig. 6 may be further amplified, if desired, to form the arrangement of Fig. 7, in which potential coils A and D and resistor 35 in series are connected between lines 1 and 2, and potential coils B and C and resistor 36 in series are connected between lines 3 and 2.

In connection with a polyphase circuit having grounded neutrals or having a neutral conductor so that current flows in the neutral, I may provide a power factor instrument having as many mechanically connected units as phases. For example, in the three-phase four-wire circuit illustrated in Fig. 8 current coils 37, 38 and 39 are connected in line conductors 1, 2, and 3 respectively, either directly or through current transformers. Crossed potential coil elements 40, 41 and 42 cooperate with the current coils 37, 38 and 39 respectively. As in the arrangement illustrated in Fig. 1, two relatively movable members are formed, one member including the mechanically connected current coils 37, 38 and 39 and the other member including the crossed potential coil elements 40, 41, and 42. Power component potential coils 43, 44 and 45 are connected between neutral conductor N and line conductors 1, 2, and 3, respectively. In order to obtain voltages in quadrature with the voltages between these points, the quadrature potential coils 46, 47 and 48 may be connected between conductors 2 and 3, 3 and 1, and 1 and 2, respectively. Although this connection may also be employed in polyphase circuits having no neutral conductor by merely connecting the neutral leads of the potential coils 40, 41, and 42 together instead of to the neutral conductor N, the arrangement of Fig. 1, requiring a smaller quantity of apparatus since there is one less unit, is obviously preferable for circuits having no neutral conductors. Similarly by a suitable arrangement of connections and the formation of appropriate networks by means of resistances, reactances or transformers, the power factor of a polyphase circuit having any number of phases may be obtained from an instrument having a number of units one less than the number of conductors of the circuit.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In combination with a polyphase alternating-current electrical circuit having a plurality of conductors, a power factor responsive device comprising a plurality of mechanically connected electrodynamometer type instrument units, each of said units comprising a current coil responsive to the current in one of the conductors of said electrical circuit and, cooperating with said current coil, a pair of crossed potential coils, one of which is responsive to the voltage between said conductor and a given point, the other of which potential coils is responsive to a voltage substantially in quadrature with the voltage affecting the first of said potential coils, said current coils each being responsive to current in a different conductor of said electrical circuit, said given point being an arbitrary point formed by the connection thereto of one side of one of the potential coils of each of said units.

2. In combination with a three-phase alternating-current electrical circuit having three conductors, a power factor responsive device comprising a pair of mechanically connected electrodynamometer type instrument units, one of said units comprising a current coil responsive to the current in one of the conductors of said electrical circuit and, cooperating with said current coil, a pair of crossed potential coils one of which is responsive to the voltage between said conductor and a second conductor, the other of which potential coils is responsive to a voltage substantially in quadrature with the voltage affecting the first of said potential coils, the other of said units comprising a current coil responsive to the current in a third conductor of said electrical circuit and, cooperating with said latter current coil, a pair of crossed potential coils one of which is responsive to the voltage between said third conductor and said second conductor, the other of which potential coils is responsive to a voltage substantially in quadrature with the voltage affecting the first potential coil of the unit.

3. In combination with a polyphase alternating-current electrical circuit having $n$ conductors, a power factor responsive device comprising $(n-1)$ mechanically connected electrodynamometer type instrument units each of which comprises a current coil responsive to the current in one of the conductors of said electrical circuit and, cooperating with said current coil, a pair of crossed potential coils, one of which is responsive to the voltage between said conductor and a common conductor, the other of which potential coils is responsive to a voltage substantially in quadrature with the voltage affecting the first of said potential coils, said current coils each being responsive to current in a different conductor of said polyphase circuit, said common conductor being a conductor with which no current coil is associated and to which one side of one of the potential coils of each of said units is connected.

4. In combination with a polyphase alternating-current electrical circuit having a plurality of conductors, a power factor responsive device comprising a plurality of mechanically connected electrodynamometer type instrument units, each of said units comprising a stationary current coil responsive to the current in one of the conductors of said electrical circuit and, cooperating with said current coil, a pair of crossed potential coils, one of which is responsive to the voltage between said conductor and a given point, the other of which potential coils is responsive to a voltage substantially in quadrature with the voltage affecting the first of said potential coils, each of said current coils being responsive to the current in a different one of said conductors, said given point being an arbitrary point formed by the connection thereto of one side of one of the potential coils of each of said units.

5. In combination with a three-phase alternating-current electrical circuit having three conductors, a power factor responsive device including three resistors connected in Y between a common neutral point and said conductors respectively, and a pair of mechanically connected electrodynamometer type instrument units, one of said units comprising a current coil responsive to the current in one of the conductors of said electrical circuit and, cooperating with said current coil, a pair of crossed potential coils, one of which is responsive to the voltage between said conductor and a second conductor, the other of which potential coils is responsive to a voltage between the third conductor of said polyphase circuit and said neutral formed by the common connection of said three resistances, the other of said units comprising a current coil responsive to the current in the third conductor of said electrical circuit and, cooperating with said current coil, a pair of crossed potential coils, one of which is responsive to the voltage between said third conductor and said second conductor, the other of which potential coils is responsive to a voltage between said first conductor and said neutral point.

6. In combination with a polyphase alternating-current electrical circuit having a plurality of conductors, a power factor responsive device including lagging means for causing voltages to exist substantially in quadrature with other voltages in said circuit and a plurality of mechanically connected electrodynamometer type instrument units, each of said units comprising a current coil responsive to the current in one of the conductors of said electrical circuit and, cooperating with said current coil, a pair of crossed potential coils, one of which, a power component potential coil, is responsive to the voltage between said conductor and a given point, the other of which, a quadrature potential coil, is responsive to a voltage produced by said lagging means substantially in quadrature with the voltage affecting said power component potential coil, said current coils each being responsive to current in a different conductor of said electrical circuit, said given point being an arbitrary point formed by the connection thereto of one side of each of the power component potential coils.

7. In combination with a three-phase alternating-current electrical circuit having three conductors, a power factor responsive device including lagging means giving rise to voltages substantially in quadrature with voltages between said conductors and a pair of mechanically connected electrodynamometer type instrument units, one of said units comprising a current coil responsive to the current in one of the conductors of said electrical circuit and, cooperating with said current coil, a pair of crossed potential coils, one of which, a power component potential coil, is responsive to the voltage between said conductor and a second conductor, the other of which, a quadrature potential coil, is responsive to a voltage produced by said lagging means substantially in quadrature with the voltage affecting the power component potential coil, the other of said units comprising a current coil responsive to the current in a third conductor of said electrical circuit and, cooperating with said latter current coil, a pair of crossed potential coils, one of which, a power component potential coil is responsive to the voltage between said third conductor and said second conductor and the other of which, a quadrature potential coil, is responsive to a voltage produced by said lagging means substantially in quadrature with the voltage affecting the latter mentioned power component potential coil.

8. In combination with a polyphase alternating-current electrical circuit having $n$ conductors, a power factor responsive device including lagging means giving rise to voltages substantially in quadrature with voltages between said conductors and $(n-1)$ mechanically connected electrodynamometer type instrument units, each of said units comprising a current coil responsive to the current in one of the conductors of said electrical circuit and, cooperating with said current coil, a pair of crossed potential coils, one of which, a power component potential coil, is responsive to the voltage between said conductor and a common conductor, the other of which, a quadrature potential coil, is responsive to a voltage produced by said lagging means substantially in quadrature with the voltage affecting said power component potential coil, said current coils each being responsive to the current in a different conductor of said electrical circuit, said common conductor being a conductor with which no current coil is associated and to which one side of each of the power component potential coils is connected.

9. In combination with a three-phase alternating-current electrical circuit having three conductors, a power factor responsive device including five resistors and a pair of mechanically connected electrodynamometer type instrument units each comprising a power component potential coil, a quadrature potential coil angularly displaced therefrom, and a current coil cooperating with said potential coils, the power component potential coil of the first of said units being connected in series with one of said resistors between the first and second of the conductors of said electrical circuit, the power component potential coil of the second of said units being connected in series with another of said resistors between a third and the second of said conductors, said quadrature potential coils and the remaining three of said resistors being arranged to form a Y-connected network having three legs, one of which comprises the quadrature potential coil of said first unit and one of said resistors in series connected between the third conductor of said electrical circuit and a common neutral point, the second of which legs comprises another of said resistors connected between the second of said conductors and said neutral point, the third of which legs comprises the quadrature potential coil of the second of said units and another of said resistors connected in series between the first of said conductors and said neutral point, the current coil of said first unit being arranged to respond to the current in the first of said conductors and the current coil of said second unit being arranged to respond to the current in the third of said conductors.

10. In combination with a three-phase alternating-current electrical circuit having three conductors, a power factor responsive device including a plurality of resistors, and a pair of mechanically connected electrodynamometer type instrument units each comprising a power component potential coil, a quadrature potential coil angularly displaced therefrom, and a current coil cooperating with said potential coils, said potential coils and said resistors being arranged to form a network having Y-connected and delta-connected portions, said Y-connected portion comprising three legs connected between said conductors respectively, and a common neutral point, and each having an intermediate point common to said delta-connected portion, said delta-connected portion comprising the power component potential coil of one of said units connected between said intermediate points on the first and second legs of said Y-connected portion, the power component potential coil of the second of said units connected between said intermediate points on the second and third legs of said Y-connected portion, and one of said resistors connected between said intermediate points on the first and third legs of said Y-connected portion, the first of the legs of said Y-connected portion comprising another of said resistors and the quadrature potential coil of the second of said units, connected in series between one of said conductors and said common neutral point, the second of said legs comprising another of said resistors connected between a second of said conductors and said common neutral and having a tap providing an intermediate point, the third of said legs comprising another of said resistors and the quadrature potential coil of the first of said units connected in series between the third of said conductors and said common neutral, the current coil of said first unit being arranged to carry current proportional to the current in the first of said conductors, and the current coil of said second unit being arranged to carry current proportional to the current in the third of said conductors.

RALPH M. ROWELL.